US012588674B2

(12) United States Patent
Nemeth et al.

(10) Patent No.: US 12,588,674 B2
(45) Date of Patent: Mar. 31, 2026

(54) CRYOGENIC COOLER

(71) Applicants: Daniel A. Nemeth, Southbury, CT (US); Lee L. Nemeth, Oxford, CT (US)

(72) Inventors: Daniel A. Nemeth, Southbury, CT (US); Lee L. Nemeth, Oxford, CT (US)

( * ) Notice: Subject to any disclaimer, the term of this patent is extended or adjusted under 35 U.S.C. 154(b) by 368 days.

(21) Appl. No.: 17/734,843

(22) Filed: May 2, 2022

(65) Prior Publication Data

US 2022/0346369 A1      Nov. 3, 2022

Related U.S. Application Data

(60) Provisional application No. 63/183,352, filed on May 3, 2021.

(51) Int. Cl.
*A01N 1/145* (2025.01)
*A01N 1/122* (2025.01)

(52) U.S. Cl.
CPC ............. *A01N 1/145* (2025.01); *A01N 1/122* (2025.01)

(58) Field of Classification Search
CPC ............................... A01N 1/0257; A01N 1/021
See application file for complete search history.

(56) References Cited

U.S. PATENT DOCUMENTS

| | | | |
|---|---|---|---|
| 4,716,742 A | 1/1988 | Germain-Lacour | |
| 4,802,345 A | 2/1989 | Curtis | |
| 4,955,204 A * | 9/1990 | Pehl | F25D 19/006 |
| | | | 62/46.3 |
| 5,355,684 A * | 10/1994 | Guice | B65D 81/3841 |
| | | | 62/457.2 |
| 5,548,964 A * | 8/1996 | Jinbo | F04B 37/08 |
| | | | 62/55.5 |
| 6,299,682 B1 * | 10/2001 | Wakita | C30B 11/003 |
| | | | 423/349 |
| 2020/0187492 A1 * | 6/2020 | Nemeth | A01N 1/0257 |

FOREIGN PATENT DOCUMENTS

JP      H06154505 A   *   6/1994

OTHER PUBLICATIONS

Morimoto, Method for Regenerating Cryopump, Jun. 3, 1994, JPH06154505A, Whole Document (Year: 1994).*
Daniel C. Joaquim, et al., "Risk of Contamination of Gametes and Embryos during Cryopreservation and Measures to Prevent Cross-Contamination" BioMed Research International (Aug. 14, 2017), 1-11, vol. 2017.

* cited by examiner

*Primary Examiner* — Larry L Furdge
(74) *Attorney, Agent, or Firm* — Ware, Fressola, Maguire & Barber LLP

(57) ABSTRACT

The present invention is directed to a cryogenic cooler that may include a cold finger coupled to a cooling source, an insulating vessel having an inner wall, an outer wall and an interior area formed within the inner wall, where the cold finger may be positioned at least partially within the interior area. The cryogenic cooler may also have a fitting positioned on the outer wall and configured for coupling to a gas source, and a passageway formed between the coupling and the inner wall and configured to allow the transfer of a gas from the gas source to the interior area. The cryogenic cooler may also have an opening is formed in the interior area so as to allow the transfer of the gas around the cold finger and out of the interior area.

16 Claims, 5 Drawing Sheets

40

14

CRYOGENIC COOLER

CROSS-REFERENCE TO RELATED APPLICATIONS

This application claims priority to U.S. Provisional Appl. No. 63/183,352 filed May 3, 2021, which is hereby incorporated by reference in its entirety.

BACKGROUND OF THE INVENTION

1. Field of the Invention

The present invention is directed to a cryogenic cooler for cryopreservation, and more particularly to a cryogenic cooler incorporating a gas system.

2. Description of Related Art

Cryopreservation involves the process of cooling biological materials, such as organelles, cell, tissues, embryos, extracellular matrix and/or organs, to very low temperatures, for example 77 Kelvin (−196° C.) using liquid nitrogen or 193 Kelvin (−80° C.) using dry ice (solid carbon dioxide). At such low temperatures, any biological and/or chemical activity that may cause damage to the biological material is effectively halted, thereby preserving the biological material. However, for the purposes of cryopreservation it is necessary to reach low temperatures without causing damage to the biological materials through the formation of ice crystals. This may be accomplished through the use of cryoprotectants and/or rapid cooling of the biological materials to the desired cryopreservation temperature.

One of the main purposes of cryopreservation is to allow for long term storage of biological materials. Such long term storage may include the storage of human or other animal egg cells or embryos for fertilization or implantation at a later time. For example, liquid nitrogen is widely used for cryopreservation associated with human in vitro fertilization (IVF), in the cattle industry (in vitro embryo production), and for livestock breeding research purposes. Liquid nitrogen has the ability to maintain ultralow temperatures of about −196° C., which is well below the freezing point of the water (0° C.), making liquid nitrogen useful for several applications, including the cell cryopreservation process. Cryopreservation is used on assisted reproduction techniques to preserve gametes and embryos for the treatment of human infertility and fertility preservation issues, as well as in cryo-banking of animal gametes and embryos in the cattle industry. The cryogenic temperature slows chemical and physical reactions of the biomolecules and stops the samples from degrading for future use.

However, liquid nitrogen can be a source of contamination, since most commercially available liquid nitrogen is not sterilized and can increase the risk of transmission and propagation of diseases. For example, sexually transmitted infections (STIs) are of major concern to reproductive specialists. Several microorganisms are able to survive at liquid nitrogen cryogenic temperatures, which can cause contamination and possible cross-contamination. Some factors have direct impact on the risks of microbial pathogen contamination in gametes and embryos during cryopreservation, such as the integrity of the embryonic zona pellucida (ZP), the freezing method, loading and sealing of the freezing container, and the sterility of both liquid nitrogen and the storage container. Accordingly, there is a potential hazard of disease transmission through cryopreserved and banked gametes and embryos in liquid nitrogen and it is desirable to minimize or prevent contamination.

In normal usage in a cryopreservation laboratory, such as an IVF laboratory, liquid nitrogen is placed in an open foam container, which is then placed near a work station laminar flow hood where Embryologists/Technicians would perform a direct plunge vitrification. To perform the direct plunge vitrification, an embryo is loaded onto the end of a vitrification stick, and in a rapid hand/arm motion coordination, the vitrification stick into the liquid nitrogen in the open container. This direct plunge procedure must be accomplished in this fast manner to optimize the cooling rate and to avoid ice-crystal formation around the cell/embryo. However, there are several drawbacks to such a procedure, such as there is a potential safety issue in the handling of an open container of liquid nitrogen while performing a precise technique in a rapid manner. The precise technique may make wearing typical protective gear, such as face shields and thermal gloves, difficult, thereby making the handling of liquid nitrogen even more precarious. Furthermore, vapor layers of varying temperature are formed over the liquid nitrogen in the open container as it naturally boils off while in contact with warmer air. Inadequate freezing during the cryopreservation process may damage valuable biological materials, such as scarce embryos. To avoid cell crystallization, the cooling rate must be optimized, but the formation of vapor layers over the liquid nitrogen is an unavoidable issue creating a different temperature gradient the embryo/cell is exposed to on the way to the liquid nitrogen. This temperature gradient could be detrimental to cryopreservation of the biological materials, as warmer temperatures, such as a first gradient of −100° C. to −135° C. and a second gradient of −135° C. to −160° C., may be encountered prior to the liquid nitrogen liquid phase at a temperature of −196° C. The warmer temperatures encountered may still result in freezing of the biological materials, but prior to immersion in the liquid nitrogen and at temperatures insufficient to prevent the formation of ice crystals. Accordingly, the safety hazards associated with liquid nitrogen cryopreservation methods are tremendous in many fronts, and overcoming vapor temperature gradient is a challenge for these processes, which are somewhat limited by the temperature of liquid nitrogen.

Therefore, there is a need for a cryopreservation technique that reduces the risk of ice crystal formation while simultaneously reducing the risks associated with the handling of liquid nitrogen.

SUMMARY OF THE INVENTION

The present invention is designed to overcome the above noted limitations that are attendant upon the use of conventional cryopreservation techniques and systems and, toward this end, it contemplates the provision of a novel a cryogenic cooler incorporating a gas system.

It is an object of the present invention to provide a cryogenic system that includes a mechanical cryogenic cooler, cold finger, containment vessel having a solid surface freezing dish with an assistant cooling gas.

It is another object of the present invention to provide a combination of a mechanical cryogenic cooler with a gas system to reach lower temperatures than what are achievable from the mechanical cryogenic cooler or liquid nitrogen alone, while allowing for full control of the temperatures.

It is yet another object of the present invention to provide a cryogenic cooler incorporating a gas system, in which the gas used is an inert gas.

It is another object of the present invention to achieve vitrification temperatures for biological materials at least as low as 53 Kelvin (−220° C.) without resulting in frosting of the vitrification surface that has been cooled to such lower temperatures.

It is yet another object of the present invention to provide a cryogenic cooler that allows a user to use a solid surface technique for the vitrification of the biological materials.

It is still another object of the present invention to provide a cryogenic cooler that reduces and/or eliminates vapor temperatures gradients that are attendant with the use of conventional vitrification techniques using liquid nitrogen.

It is another object of the present invention to provide a cryogenic cooler that eliminates the risks associated with potential contact with liquid nitrogen that are attendant with conventional vitrification techniques.

It is yet another object of the present invention to provide a cryogenic cooler that allows for the use of a sterile surface with each new biological material if desired to reduce and/or eliminate cross-contamination.

It is still another object of the present invention to provide a cryogenic cooler that eliminates and/or reduces the concerns associated with evaporation/boiling of liquid nitrogen and safety hazards associated with handling of liquid nitrogen.

These and other objects of the present invention will become further apparent in view of the additional discussions provided below.

In accordance with exemplary aspects of the present invention, a cryogenic cooler is provided that may include a cold finger coupled to a cooling source, an insulating vessel having an inner wall, an outer wall and an interior area formed within the inner wall, where the cold finger may be positioned at least partially within the interior area, a fitting positioned on the outer wall and configured for coupling to a gas source, and a passageway formed between the coupling and the inner wall and configured to allow the transfer of a gas from the gas source to the interior area.

In accordance with this and other exemplary aspects of the present invention, the cryogenic cooler may also have an opening is formed in the interior area so as to allow the transfer of the gas around the cold finger and out of the interior area.

In accordance with this and other exemplary aspects of the present invention, the cryogenic cooler may also have a freezing disk positioned in thermal contact with the cold finger.

In accordance with this and other exemplary aspects of the present invention, the insulating vessel may also include a space between the inner wall and the outer wall.

In accordance with this and other exemplary aspects of the present invention, the space between the inner wall and the outer wall may be at least partially filled by an insulating material.

In accordance with this and other exemplary aspects of the present invention, the space between the inner wall and the outer wall is substantially a vacuum.

In accordance with this and other exemplary aspects of the present invention, the cooling source is a mechanical cooler.

In accordance with this and other exemplary aspects of the present invention, the cooling source is liquid nitrogen.

In accordance with this and other exemplary aspects of the present invention, the gas is an inert gas.

In accordance with this and other exemplary aspects of the present invention, the cryogenic cooler may also include an insulating lid configured to at least cover the opening of the interior area.

In accordance with this and other exemplary aspects of the present invention, the transfer of the gas around the cold finger and out of the interior area is configured to substantially purge the interior area of room air.

In accordance with this and other exemplary aspects of the present invention, the freezing disk may include at least one port configured to allow passage of the gas through the freezing disk.

In accordance with this and other exemplary aspects of the present invention, a temperature of the gas upon entering the interior area is at or below room temperature.

In accordance with this and other exemplary aspects of the present invention, transfer of the gas around the cold finger and out of the interior area is configured to substantially envelop the freezing disk.

In accordance with this and other exemplary aspects of the present invention, the gas is Helium, Argon, Nitrogen or a combination thereof.

In accordance with this and other exemplary aspects of the present invention, the cold finger is comprised of copper.

In accordance with other exemplary aspects of the present invention, a method of cooling a freezing disk to a vitrification temperature for use in vitrification of biological materials is provided that may include thermally coupling the freezing disk to a cold finger thermally coupled to a cooling source, insulating the cold finger from an ambient environment so as to reduce heat gain of the cold finger, and introducing a gas to at least partially envelop the freezing disk and the cold finger so as to reduce the presence of room air around the freezing disk and the cold finger.

In accordance with this and other exemplary aspects of the present invention, the gas is an inert gas.

In accordance with this and other exemplary aspects of the present invention, the gas has a temperature of condensation below the vitrification temperature of the freezing disk.

BRIEF DESCRIPTION OF THE DRAWINGS

For a fuller understanding of the nature and objects of the present invention, reference is made to the following detailed description taken in connection with the accompanying drawings in which.

DETAILED DESCRIPTION

Figure 1:
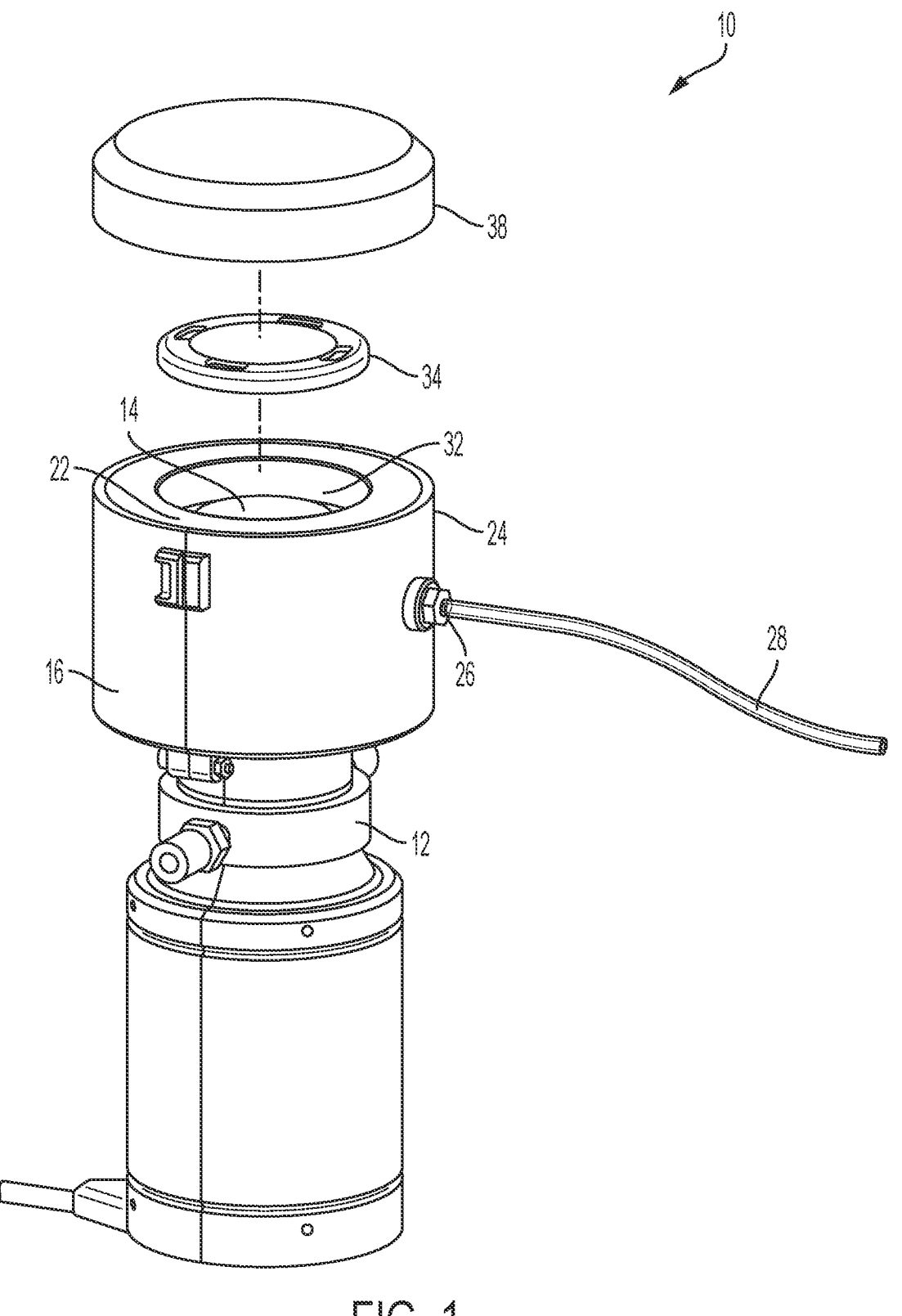
FIG. 1 is a partially exploded view of an exemplary embodiment of a cryogenic cooler incorporating a gas system according to the present invention.
Figure 2:
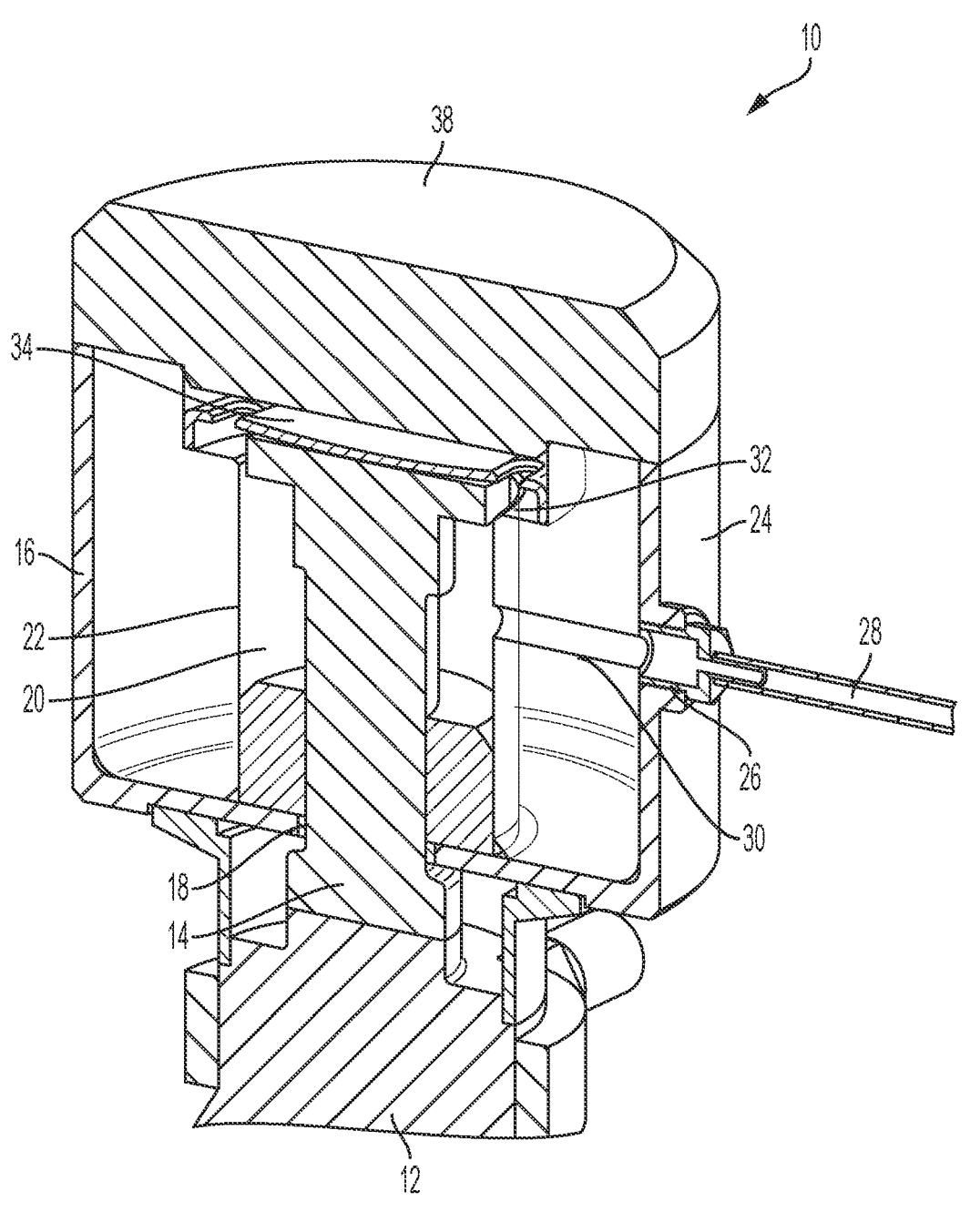
FIG. 2 is a zoomed in cross-sectional view of a portion of the cryogenic cooler incorporating a gas system from FIG. 5.
Figure 3:
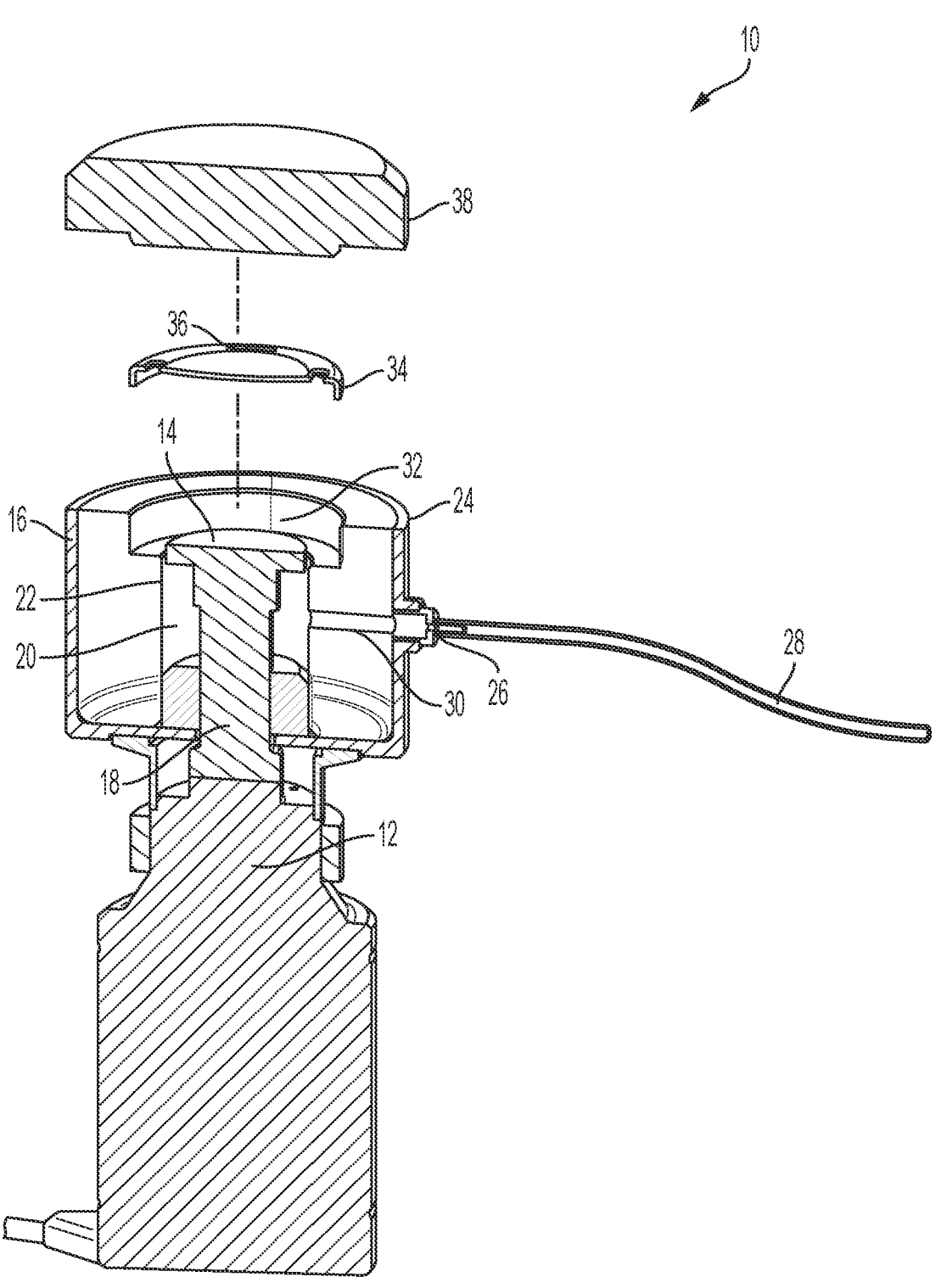
FIG. 3 is a partially exploded cross-sectional view of the cryogenic cooler incorporating a gas system from FIG. 1.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring now to FIGS. 1-3 and 5, therein illustrated is a cryogenic cooler, generally indicated by reference number 10, for use in the cryopreservation of biological materials. The cryogenic cooler 10 may include a mechanical cooling device 12 that is configured to provide cooling to at least one cold finger 14 extending from the mechanical cooling device 12. The mechanical cooling device 12 may be a mechanical cryogenic cooler, for example an electrically refrigerated cryostat, such as a Cryo-Pulse 5 Plus available from Mirion Technologies. The mechanical cooling device 12 may be configured to reduce the temperature of the cold finger 14 to lower than 77 Kelvin (−196° C.). The cold finger 14 may be made from a thermally conductive material, such as cooper. The cold finger 14 extends from the mechanical cooling device 12 into an insulating vessel 16 of the cryogenic cooler 10. The insulating vessel 16 may include a bottom opening 18 from which the cold finger 14 passes through into an interior area 20 of the insulating vessel 16. The interior area 20 of the insulating vessel 16 is at least partially enclosed by an inner wall 22, which is spaced apart from an outer wall 24 of the insulating vessel 16. The outer wall 24 extends around the perimeter of the insulating vessel 16, and at least partially encloses the space between the inner wall 22 and the outer wall 24. The space between the inner wall 22 and the outer wall acts as an insulator against heat gain/cold loss by the cold finger 14, and may be comprised of a vacuum or insulating material (not shown), or a combination thereof as is understood by one of ordinary skill in the art regarding insulated containers.

Still referring to FIGS. 1-3 and 5, the outer wall 24 may include a fitting 26 configured for connection to a gas line 28 connected to a gas source (not shown). The fitting 26 is coupled to a passageway 30 extending through the space between the outer wall 24 and inner wall 22, and the passageway 30 connects the fitting 26 to the interior area 20 of the insulating vessel 16. The communication of the gas line 28, fitting 26, passageway 30 and interior area 20 provides for a flow path for a gas from the gas source to flow into the interior area 20 and envelop the cold finger 14. The gas may be any inert gas, such as noble gases like Helium or Argon, or Nitrogen. The gas flows into the interior area 20 and exits an upper opening 32 of the insulating vessel 16. The upper opening 32 may be slightly larger than the top surface of the cold finger 14 so that there is sufficient space for the gas to escape the interior area 20 past the cold finger 14. The cryogenic cooler 10 may also include a solid surface freezing dish 34 disposed on the cold finger 14, on which cryopreservation of biological materials, such as human or other animal eggs and/or embryos may be vitrified. The solid surface freezing dish 34 may made from a thermally conductive material, such as cooper, and may be chrome plated in order to provide for ease of cleaning. The solid surface freezing dish 34 may include one or more ports 36 to allow passage of the gas through the solid surface freezing dish 34. Alternatively or in addition, the solid surface freezing dish 34 may be dimensioned so as to smaller than the upper opening 32 to allow for passage of the gas out of the upper opening 32. The solid surface freezing dish 34 may be removable from the cryogenic cooler 10 so that a new and/or newly sterilized solid surface-freezing dish 34 can be used for each biological material or group of biological material from the same source as desired. The cryogenic cooler 10 may also include an insulating lid 38 that may be placed on the top of the cryogenic cooler 10 in order to at least partially cover the upper opening 32 and the cold finger 14 in order to reduce heat gain/cold loss while the cryogenic cooler 10 is not actively being used in the cryopreservation of biological materials.

Figure 4:
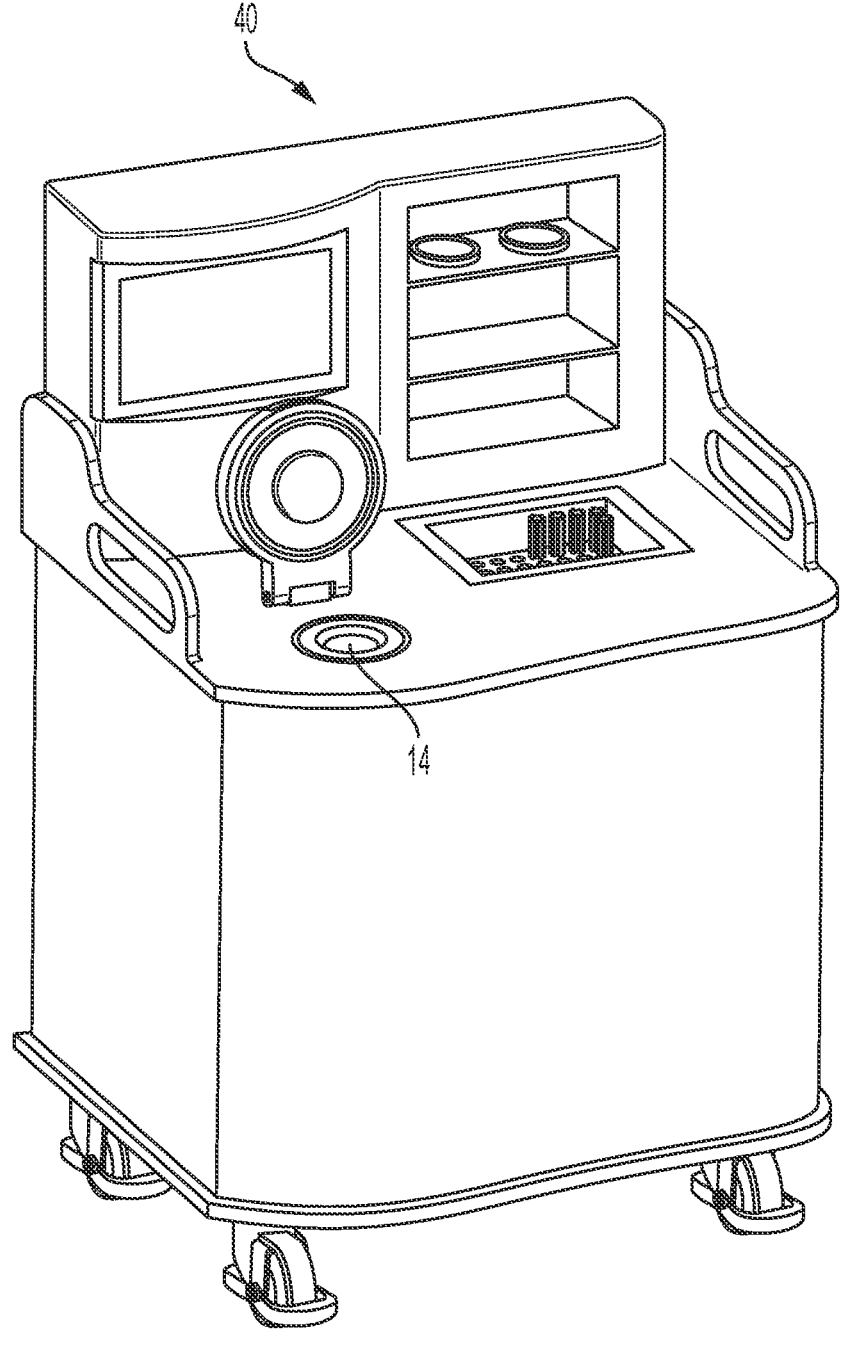
FIG. 4 is a perspective view of an exemplary cryogenic cart having an exemplary cryogenic cooler incorporating a gas system according to the present invention contained therein.
Figure 5:
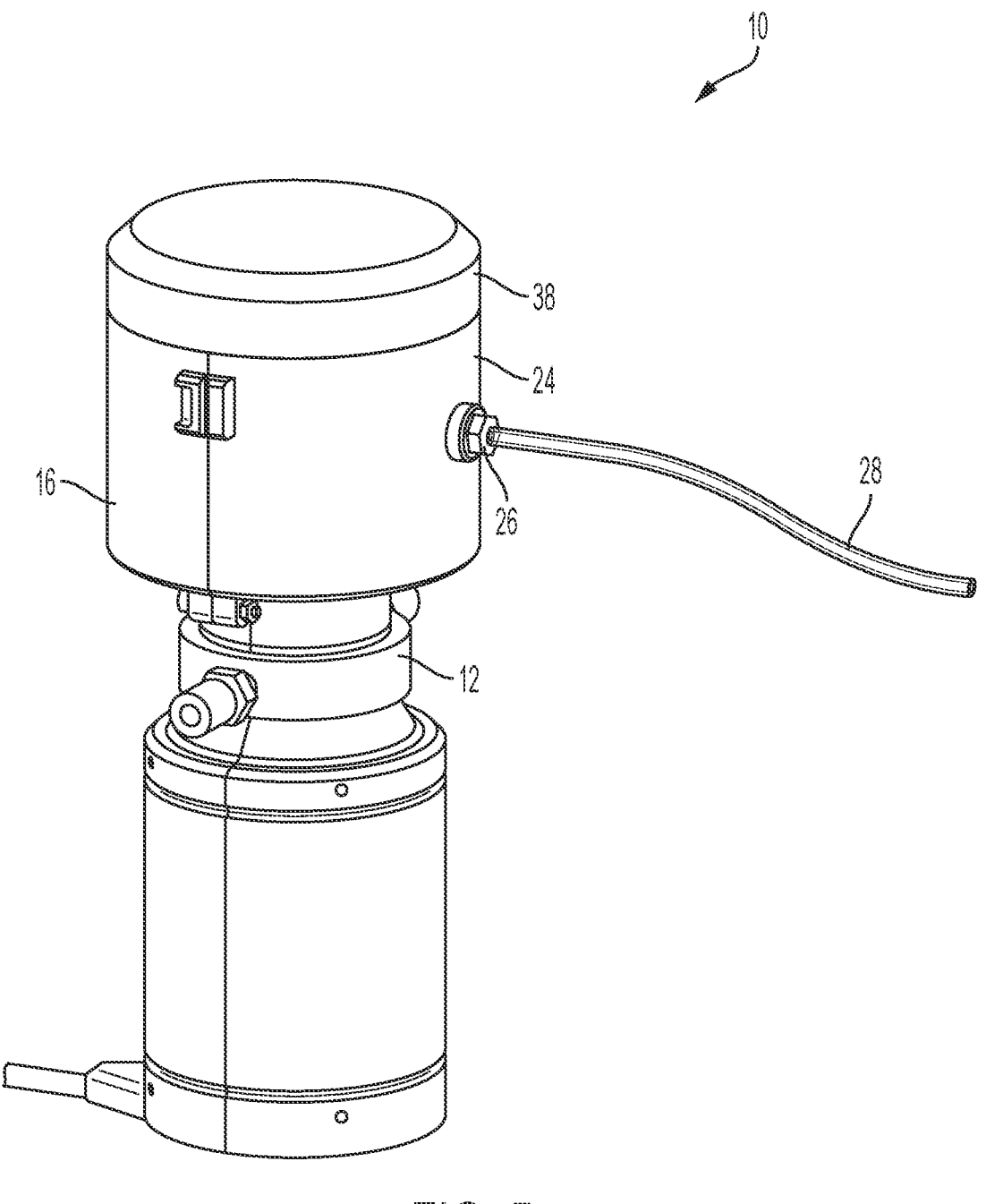
FIG. 5 is perspective few of the exemplary embodiment of the cryogenic cooler incorporating a gas system according to the present invention.

The cryogenic cooler 10 may be used in a laminar flow hood (not shown) or a stand-alone cryogenic cart 40, as shown for example in FIG. 4. In operation, the flow of gas is initiated from the gas source (not shown) through the gas line 28, and into the interior area 20 surrounding the cold finger 14. The gas will then exit the interior area 20 past the solid surface freezing dish 34 as a result of the continuous flow of the gas from the gas source and/or rising of the gas (if lighter than air) out of the cryogenic cooler 10. It is understood that the flow of gas should be sufficient so the area around the solid surface freezing dish 34 has reduced room air or has been purged of room air so as to reduce or eliminate frosting of the solid surface freezing dish 34 from condensation and/or freezing of water vapor and other gases present in room air. However, it is further understood that the flow of gas should not be so great as to continuously introduce warmer gas into the interior area 20 that may reduce the cooling efficiency of the mechanical cooling device 12. The cold finger 14 will have been cooled to the desired temperature by the mechanical cooling device 12, and a solid surface freezing dish 34 is installed on the cold finger 14 in order to act as a vitrification surface for vitrification of the desired biological materials. Once the cold finger 14 and/or solid surface freezing dish 34 reach the desired vitrification temperature, the user may use a vitrification stick with a biological material disposed thereon to contact the solid surface freezing dish 34 to vitrify the biological material. Should the user desire to avoid cross-contamination between biological materials, the solid surface freezing dish 34 may be replaced and/or cleaned between vitrification of different biological materials. The use of the gas surrounding the cold finger 14 and exiting past the solid surface freezing dish 34 allows for the vitrification process to occur at lower temperatures than those achievable from use of the mechanical cooling device 12 or liquid nitrogen alone. For example, the use of Nitrogen gas allows for achieving a temperature at least as low as 77 Kelvin (−196° C.), and the use of Helium gas allows for achieving a temperature at least as low as 53 Kelvin (−220° C.). However, it is understood that the present invention is not limited to the use of any particular gas, and the gases mentioned above are merely exemplary. It is also understood that the presence of a gas, such as an inert gas, provides for an environment that increases the cooling efficiency of the mechanical cooling device 12 by reducing or eliminating the likelihood of condensation and/or frost forming on the cold finger 14 as it is cooled by the mechanical cooling device 12. At low temperatures, water vapor and other gases present in ambient room air may begin to condense on the cold finger 14. The condensation of such water vapor and/or other gases generates heat, which must be overcome by the mechanical cooling device 12. Placing the cold finger 14 in an environment in which water vapor has been eliminated or at least greatly reduced, and in which the gas or gases present have a lower condensation point allows for the mechanical cooling device 12 to operate to remove heat from, and thereby cool, the cold finger 14 with greater efficiency.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A cryogenic cooler, comprising:
a cold finger coupled to a cooling source;
an insulating vessel having an inner wall, an outer wall and an interior area formed within the inner wall, wherein the cold finger is positioned at least partially within the interior area;
a fitting positioned on the outer wall and configured for coupling to a gas source;
a passageway formed between the coupling and the inner wall and configured to allow the transfer of a gas from the gas source to the interior area; and
a freezing disk positioned in thermal contact with the cold finger;
wherein an opening is formed in the interior area so as to allow the transfer of the gas around the cold finger and out of the interior area; and
wherein the freezing disk comprises a first exterior side and a second exterior side;
wherein the second exterior side of the freezing disk is positioned to face the cold finger and at least partially in contact with the cold finger;
wherein the first exterior side of the freezing disk is positioned parallel to the second exterior side of the freezing disk and positioned to face away from the cold finger;
wherein the freezing disk comprises at least one port formed in the freezing disk and forming a passageway between the first exterior side of the freezing disk and the second exterior side of the freezing disk, wherein the at least one port is configured to allow unidirectional passage of the gas through the freezing disk.

2. The cryogenic cooler according to claim 1, wherein the insulating vessel further comprises a space between the inner wall and the outer wall.

3. The cryogenic cooler according to claim 2, wherein the space is at least partially filled by an insulating material.

4. The cryogenic cooler according to claim 2, wherein the space is substantially a vacuum.

5. The cryogenic cooler according to claim 1, wherein the cooling source is a mechanical cooler.

6. The cryogenic cooler according to claim 1, wherein the cooling source is liquid nitrogen.

7. The cryogenic cooler according to claim 1, wherein the gas is an inert gas.

8. The cryogenic cooler according to claim 1, further comprising an insulating lid configured to at least cover the opening of the interior area.

9. The cryogenic cooler according to claim 1, wherein the transfer of the gas around the cold finger and out of the interior area is configured to substantially purge the interior area of room air.

10. The cryogenic cooler according to claim 1, wherein a temperature of the gas upon entering the interior area is at or below room temperature.

11. The cryogenic cooler according to claim 1, wherein transfer of the gas around the cold finger and out of the interior area is configured to substantially envelop the freezing disk.

12. The cryogenic cooler according to claim 1, wherein the gas is Helium, Argon, Nitrogen or a combination thereof.

13. The cryogenic cooler according to claim 1, wherein the cold finger is comprised of copper.

14. A method of cooling a freezing disk to a vitrification temperature for use in vitrification of biological materials, comprising:
thermally coupling the freezing disk to a cold finger thermally coupled to a cooling source;
insulating the cold finger from an ambient environment so as to reduce heat gain of the cold finger; and
introducing a gas to at least partially envelop the freezing disk and the cold finger so as to reduce the presence of room air around the freezing disk and the cold finger;
wherein the freezing disk comprises a first exterior side and a second exterior side;
wherein the second exterior side of the freezing disk is positioned to face the cold finger and at least partially in contact with the cold finger;
wherein the first exterior side of the freezing disk is positioned parallel to the second exterior side of the freezing disk and positioned to face away from the cold finger;
wherein the freezing disk comprises at least one port formed in the freezing disk and forming a passageway between the first exterior side of the freezing disk and the second exterior side of the freezing disk, wherein the at least one port is configured to allow unidirectional passage of the gas through the freezing disk.

15. The method according to claim 14, wherein the gas is an inert gas.

16. The method according to claim 14, wherein the gas has a temperature of condensation below the vitrification temperature of the freezing disk.

* * * * *